Feb. 27, 1973 D. L. MONTGOMERY 3,718,519

METHOD OF MAKING FLAT ROTATABLE DISC ASSEMBLIES

Filed July 21, 1971

3,718,519
METHOD OF MAKING FLAT ROTATABLE DISC ASSEMBLIES

Donald Lee Montgomery, 12621 Victoria Ave., Los Angeles, Calif. 90066
Filed July 21, 1971, Ser. No. 164,694
Int. Cl. B32b *31/00;* G06c *27/00*
U.S. Cl. 156—250 5 Claims

ABSTRACT OF THE DISCLOSURE

A rotatable disc assembly includes top and bottom panels sandwiching a disc therebetween. Rather than the usual grommet for rotatably mounting the disc, a concentric disc is cut in the disc material and its top and bottom surfaces are glued to the top and bottom panels respectively. The concentric disc thus serves as a bearing for the disc itself.

This invention relates generally to flat rotatable disc assemblies and more particularly to the method of forming such assemblies and the resulting product.

BACKGROUND OF THE INVENTION

Flat rotatable disc assemblies of the type under consideration generally comprise top and bottom panels sandwiching a rotatable disc therebetween. At least one of the panels will include windows or cut outs for exposing indicia on the disc. Thus the assembly may be designed for educational purposes wherein a numerical problem will appear in one window and the answer in another window radially displaced relative to the axis of rotation of the disc. Simple multiplication problems such as the multiplication tables may be printed on a circumferential path on the disc for exposure through the problem window as the disc is rotated. The corresponding answers in turn would be printed on a smaller circumferential path on the disc for exposure through the answer window.

Such devices are generally formed from stiff cardboard or similar flat stock and a grommet or rivet type structure utilized to rotatably mount the disc between the top and bottom panels. The use of a grommet or rivet type structure results in one of the most expensive of the various steps in manufacturing the assemblies. Further, the insertion of the grommet for proper rotatable mounting of the disc is a time consuming step and in this respect limits the number of assemblies that can be manufactured per unit time with automatic equipment.

Some further problems encountered as a result of the use of grommets or rivets for rotatably mounting the disc are as follows. First, the grommet is exposed on either side of the top and bottom panels and generally protrudes a slight amount so that the assembly cannot lie absolutely flat. Stacking of a large number of assemblies is thus difficult. In addition, the protrusion of the grommet on either face of the top and bottom panels uses up some of the area so that any writing is interrupted on both sides. Finally, the grommet defines a given bearing surface in thickness and thus if the paper board utilized in forming the central disc should vary in thickness, the degree of friction of the disc with the panels will vary. If the disc rotates too freely, it is difficult to hold it in a desired position while reading an answer or studying a problem. On the other hand, if the friction is too great such as would occur for too thick a flat stock paper board, it is very difficult to manually rotate the disc. The most desirable situation occurs when the thickness of the disc is precisely the same as that of the bearing surface defined by the grommet or fastener.

BRIEF DESCRIPTION OF THE PRESENT INVENTION

Bearing the foregoing in mind, the present invention provides a novel method of manufacturing and a novel resulting disc assembly in which the foregoing problems are substantially overcome.

More particularly, in accord with the method of the invention top and bottom panels are cut from flat stock in the usual manner. Also, the disc is cut from flat stock which may be the same as that used for the panels or different. Simultaneously with the cutting of the disc or immediately thereafter, a concentric disc of smaller diameter is cut in the disc. Adhesive means are provided for the top and bottom surface portions of the concentric disc only. Thereafter the disc with the concentric disc concentrically disposed therein is sandwiched between the top and bottom panels and the top and bottom surfaces of the concentric disc then sealed only to the top and bottom panels respectively so that the concentric disc serves as a bearing for rotation of the disc between the panels.

Since the thickness of the concentric disc is precisely the same as the disc itself since it is of the same stock, a uniform bearing friction always results. Further, there are no protrusions above or below the top and bottom panels so that the assemblies can lie perfectly flat. Moreover, there is no interruption in the top and bottom panel surface areas so that any illustrative material can be printed in an uninterrupted manner.

BRIEF DESCRIPTION OF THE DRAWINGS

A better understanding of the method and product of this invention will be had by referring to the accompanying drawings in which.

DETAILED DESCRIPTION OF THE INVENTION

Figure 1:
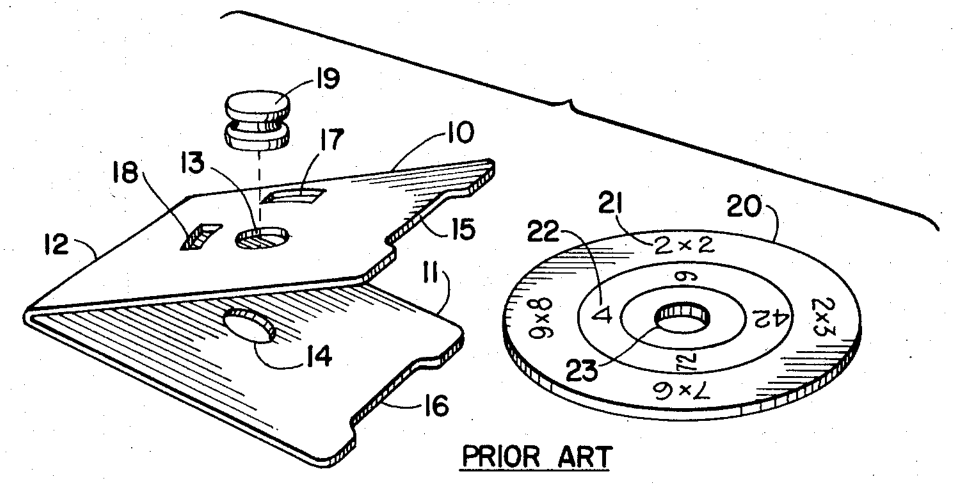
FIG. 1 is a perspective view in exploded form showing a typical prior art rotatable disc assembly.

Referring to FIG. 1 there is shown a typical prior art flat rotatable disc assembly comprised of top and bottom panels 10 and 11 which may be stamped from flat stock and folded about a fold line 12. Grommet or rivet openings 13 and 14 are formed in the central portions of the top and bottom panels as shown. Also, suitable edge cut outs 15 and 16 as well as windows 17 and 18 may be formed during the stamping or cutting operation. A grommet fastener 19 is shown exploded above the panel members.

To the right of the panels there is illustrated a disc 20 which may include indicia as indicated at 21 and 22 on one or both surfaces. The disc 20 includes a central opening 23 for registration with the opening 13 and 14 when the disc 20 is sandwiched between the top and bottom panels 15 and 16.

It will be evident that in assembling the prior art structure described in FIG. 1, the grommet 19 is passed through the registered openings when the disc is sandwiched between the panels and deformed in such a manner to secure the disc within the panels. However, it will also be evident that by utilizing such a grommet or equivalent rivet structure, there is a slight protrusion above the top and bottom surfaces of the panels 10 and 11 which prevent the assembly from lying absolutely flat and thus renders it difficult to stack a number of such assemblies.

Further, any printed or illustrative matter on the top and bottom surfaces would be interrupted by the projecting portion of the grommet. Finally, and as mentioned heretofore the step of securing the grommet in position is time consuming and costly.

Figures 2, 3:
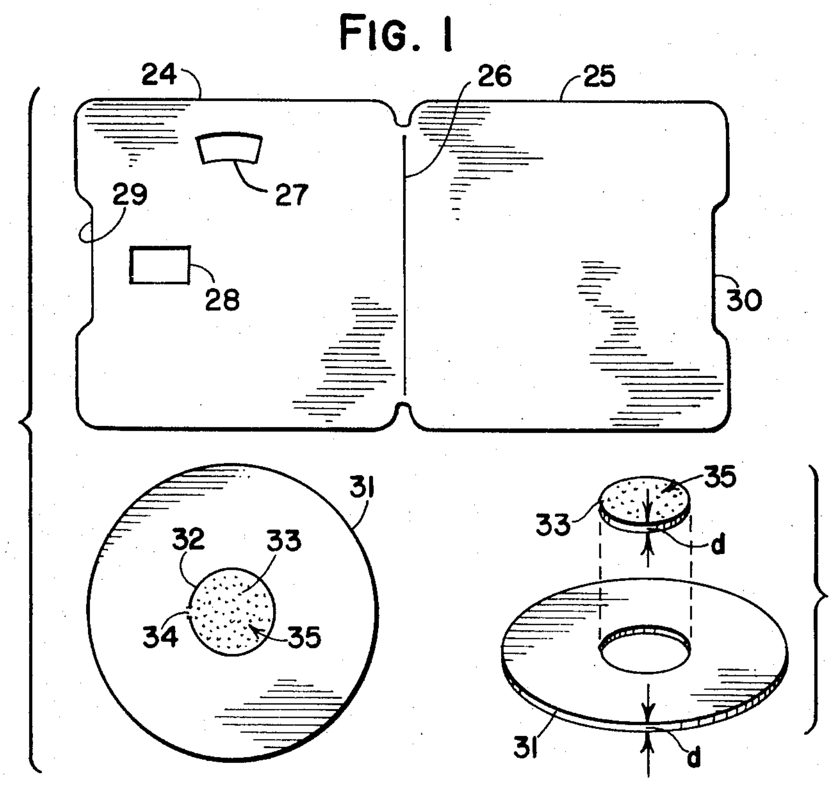
FIG. 2 illustrates cut outs or stampings utilized in carrying out the method of manufacturing a flat rotatable disc assembly in accord with the present invention.
FIG. 3 shows the disc cut out of FIG. 2 with a concentric disc exploded therefrom.

Referring now to FIG. 2, the manner in which the foregoing problems are overcome by the present invention will be understood. In FIG. 2, there is shown in the upper portion a single stamping or cut out in the form of an elongated rectangle defining top and bottom panels 24 and 25 when the cut out is folded about a mid line 26. One or both of the panels may include cut out windows 27 and 28 as well as edge cut outs 29 and 30 so that when the structure is assembled there will be exposed a peripheral edge of the rotatable disc for easy manual manipulation.

A central disc 31 which may be cut from the same flat stock as the panels or from different flat stock, has a concentric circle 32 also cut to define a concentric disc 33. In the particular embodiment illustrated, the cutting of the concentric disc 33 is terminated short of a complete circumference to leave a small integral connection 34 of less than 10° between the disc 31 and the periphery of the concentric disc 33. The purpose for this small connection is simply to hold the concentric disc in concentric position relative to the disc 31 while assembly is completed.

FIG. 3 illustrates the concentric disc 33 removed from the disc 31 wherein it will be noted that the thickness *d* of the concentric disc is precisely the same as the thickness *d* of the disc 31 which must necessarily always follow since the disc 33 is of the same material as the disc 31.

In the particular embodiment of FIGS. 2 and 3, an adhesive means 35 is applied to the surfaces of the concentric disc 33 only. Thereafter, the disc 31 with the concentric disc 33 positioned therein is sandwiched between the panels 24 and 25. Alternatively, the central or entire inside surface portions of the panels 24 and 25 may be coated with a heat sensitive adhesive, only the central portions being exposed to heat to effect the sealing to the concentric disc.

Figure 4:
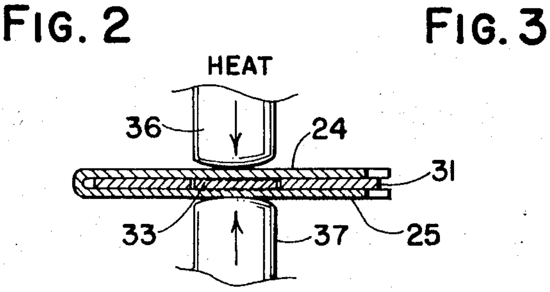
FIG. 4 shows a final step in the assembly.

FIG. 4 illustrates a final step in the method wherein opposite surfaces of the concentric disc 33 are heat sealed to the panels 24 and 25 by suitable irons 36 and 37.

After the sealing has been completed, initial rotation of the disc 31 will break the small connection 34 described in FIG. 2 so that the concentric disc 33 then becomes a bearing for rotation of the disc 31. Since the thickness is the same, as mentioned heretofore, the friction will be uniform on successive disc assemblies made in accord with the method of this invention. Further, there will be no protuberances above or below the top and bottom panels and the areas will be perfectly free for illustrative matter.

Another important advantage of the present invention resides in the fact that the concentric disc comprising the bearing can be cut of a diameter to provide a relatively large bearing area defined about the circumference of the concentric disc. Normally this area will be about five times as great as for a conventional grommet with the attendant advantage of longer wear and more stable operation; that is, there will be less likelihood of "play" between the bearing and the main disc as can occur with a small grommet which would eventually wear a larger hole in the disc.

In preferred embodiments, the smaller diameter concentric disc would have the value of between 1/10 and 1/3 the diameter of the main disc.

OPERATION

In operation, a person may readily manually rotate the disc 31 after it has been assembled within the panels 24 and 25 in the same manner as operating the prior art assembly described in FIG. 1. Thus the cut outs 29 and 30 serve to expose a peripheral portion of the disc after assembly for easy manual manipulation. Certain problems may be viewed through one of the windows and in the specific example of the prior art there are illustrated multiplication problems. Thus if the disc of FIG. 2 were provided with the same indicia as shown in the prior art structure, the multiplication problem 2 times 2 would appear in the window 27 and the answer would appear in the window 28.

From the foregoing description, it will be evident that the present invention has provided a greatly improved method and product in the field of flat rotatable disc assemblies wherein various problems encountered with the use of grommets have been wholly eliminated. The actual manufacturer of flat rotatable disc assemblies in accord with the method of this invention is considerably faster and more economical than is the manufacture when grommets or rivets are used. Thus it is not necessary to introduce any foreign metallic parts or provide any special machinery for inserting the same. Rather the substitute step of simply applying adhesive or heat sensitive material either to the opposite surfaces of the concentric disc or to the interior surfaces of the panels and then pressing or sealing only the surface areas engaging the concentric disc to the disc can very easily be carried out with a minimum of time and expense.

While a particular example of a flat rotatable disc assembly has been described for purposes of illustration, it should be understood that the principles of the present invention are applicable to any type of flat rotatable disc assembly or even for use in calculations, educational devices, advertising, toys, games and the like.

In fact, because the bearing is no thicker than the disc, assemblies can be made out of thin paper and still operate effectively. Further, while the rotatable disc is usually round, it may have any shaped perimeter desired. The term "disc" except as used to connote the concentric bearing disc, is thus not to be thought of as limited to a circular member.

What is claimed is:

1. A method of making a flat rotatable disc assembly wherein a disc is sandwiched between top and bottom panels, for rotation relative thereto, comprising the steps of:

(a) cutting from flat stock top and bottom panels;

(b) cutting from flat stock a disc;

(c) cutting a concentric disc in said disc of smaller diameter;

(d) providing adhesive means for sealing the top and bottom surface portions of said concentric disc to inside central surface portions of said panels;

(e) sandwiching said disc with said concentric disc concentrically disposed therein between said top and bottom panels; and (f) sealing the top and bottom surfaces of said concentric disc only to said top and bottom panels respectively whereby said concentric disc serves as a bearing for rotation of said disc between said panels.

2. The method of claim 1, in which said top and bottom panels are cut simultaneously in the form of an elongated rectangle which is foldable about a mid line to define said top and bottom panels, said disc being cut from the same stock as said panels.

3. The method of claim 1, in which the cutting of said concentric disc is terminated short of a complete circumference to leave a small integral connection of less than 10° between said disc and the periphery of said concentric disc to thereby hold said concentric disc in said disc while sandwiching said disc between said panels and sealing said concentric disc to said panels, said connection being broken by initial rotation of said disc relative to said panels.

4. The method of claim 1, in which windows and edge cut outs are simultaneously cut in forming said panels, said cut outs exposing a peripheral portion of said disc after assembly for enabling easy manual rotation of said disc.

5. The method of claim 1, in which the sealing step includes applying heat to the top and bottom central areas of said panels after said disc is sandwiched therebetween, said adhesive means being heat sensitive to effect a heat seal of said concentric disc to said panels.

References Cited

UNITED STATES PATENTS

| | | | |
|---|---|---|---|
| 2,551,664 | 5/1951 | Galper | 156—250 |
| 3,027,286 | 3/1962 | Kurhan | 156—264 |
| 3,072,519 | 1/1963 | Salzman | 156—250 |
| 3,345,240 | 10/1967 | O'Herron | 156—264 |

DOUGLAS J. DRUMMOND, Primary Examiner

U.S. Cl. X.R.

156—265, 290; 235—78